(12) United States Patent
Kong

(10) Patent No.: US 7,967,330 B2
(45) Date of Patent: Jun. 28, 2011

(54) CRASH PAD FOR AUTOMOTIVE INTERIOR AND APPARATUS FOR MANUFACTURING THE SAME

(75) Inventor: Byung Seok Kong, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 57 days.

(21) Appl. No.: 12/479,167

(22) Filed: Jun. 5, 2009

(65) Prior Publication Data

US 2010/0084842 A1    Apr. 8, 2010

(30) Foreign Application Priority Data

Oct. 8, 2008   (KR) .................. 10-2008-0098582

(51) Int. Cl.
*B60R 21/16* (2006.01)

(52) U.S. Cl. ............... 280/728.3; 280/731; 280/732
(58) Field of Classification Search ............... 280/728.2, 280/731, 732
See application file for complete search history.

(56) References Cited

U.S. PATENT DOCUMENTS

| | | | | |
|---|---|---|---|---|
| 5,883,356 A * | 3/1999 | Bauer et al. | ............... | 219/121.62 |
| 6,294,124 B1 * | 9/2001 | Bauer et al. | ............... | 264/400 |
| 6,726,239 B1 * | 4/2004 | Teranishi et al. | .......... | 280/728.3 |
| 6,753,057 B1 * | 6/2004 | Gardner, Jr. | ................ | 428/43 |
| 6,808,197 B2 * | 10/2004 | Bauer et al. | ............... | 280/728.3 |
| 7,063,349 B2 * | 6/2006 | Takahashi | ............... | 280/728.2 |
| 7,229,095 B2 * | 6/2007 | Nishijima et al. | ........... | 280/732 |
| 7,275,759 B2 * | 10/2007 | Sawada | ............... | 280/728.3 |
| 7,425,018 B2 * | 9/2008 | Suwama et al. | .......... | 280/728.3 |
| 7,429,058 B2 * | 9/2008 | Chen et al. | ................ | 280/728.3 |
| 7,770,915 B2 * | 8/2010 | Nishijima et al. | ........ | 280/728.3 |
| 7,798,519 B2 * | 9/2010 | Kawabe et al. | ............ | 280/728.3 |
| 2006/0033313 A1 * | 2/2006 | Horiyama | ................ | 280/728.3 |

* cited by examiner

*Primary Examiner* — Toan C To
(74) *Attorney, Agent, or Firm* — Morgan, Lewis & Bockius LLP

(57) ABSTRACT

Disclosed herein is a crash pad for an automotive interior, including a passenger air-bag door, which may have a main resin layer including a door region having a hinge portion and a tear line for a deployment of an air-bag and a crash pad region at least partially surrounding the door region, in which the hinge portion has a groove formed on a lower surface of the main resin layer along a longitudinal direction of the passenger air-bag door, and a lower resin layer disposed on a lower surface of the main resin layer to cover the hinge portion and having flexibility or a percentage of elongation superior to the main resin layer.

14 Claims, 6 Drawing Sheets

CRASH PAD FOR AUTOMOTIVE INTERIOR AND APPARATUS FOR MANUFACTURING THE SAME

CROSS-REFERENCE TO RELATED APPLICATION

The present application claims priority to Korean Patent Application Number 10-2008-0098582 filed on Oct. 8, 2008, the entire contents of which application is incorporated herein for all purposes by this reference.

BACKGROUND OF THE INVENTION

1. Field of the Invention

The present invention relates to a crash pad for an automotive interior and an apparatus for manufacturing the crash pad, and, more particularly, to a crash pad for an automotive interior which is adapted to prevent a hinge portion of an air-bag door for a passenger seat from being broken at the time of deployment of a passenger air-bag and an apparatus for manufacturing the crash pad.

2. Description of Related Art

A crash pad is a panel made of resin material for finishing a front area of a vehicle interior. For a vehicle equipped with a passenger air-bag, the crash pad is provided with a passenger air-bag door to allow the passenger air-bag to be deployed therethrough.

As shown in FIG. 1, as a rule, the air-bag door 2 is configured such that an area thereof is defined by a tear line 3 and a hinge portion 4 which are formed on the crash pad 1. When the tear line 3 of the air-bag door 2 is torn and the passenger air-bag door 2 is pushed out by the passenger air-bag at the time of deployment of the air-bag, the hinge portion 2 may break and the door 2 may separate from the crash pad 1 due to a momentarily strong expansionary force of the air-bag.

The hinge portion refers to a connecting or boundary region between the door pushed out by the air-bag and the crash pad. The fact itself that the door separates from the crash pad toward a passenger during the deployment thereof may give rise to a consumer's complaint, and thus initial deployment of the air-bag into a predetermined normal shape cannot be achieved at all. Furthermore, the opening of the crash pad, resulting from the separation of the air-bag door, may disfigure the appearance of the crash pad, and the passenger may be injured by sharp edges (the tear line or the hinge portion) of the air-bag door separated from the crash pad.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a crash pad for automotive interior which is adapted to prevent an air-bag door from breaking and then separating from the crash pad at the time of deployment of the air-bag, and an apparatus for manufacturing the crash pad.

In an aspect of the present invention, a crash pad for an automotive interior, including a passenger air-bag door, may have a main resin layer including a door region having a hinge portion and a tear line for a deployment of an air-bag and a crash pad region at least partially surrounding the door region, in which the hinge portion has a groove formed on a lower surface of the main resin layer along a longitudinal direction of the passenger air-bag door, and a lower resin layer disposed on a lower surface of the main resin layer to cover the hinge portion and having flexibility or a percentage of elongation superior to the main resin layer.

An airbag housing may be disposed under the main resin layer and encloses the hinge portion and the tear line.

A transverse section of the groove may have an upwardly-concave shape with a predetermined curvature.

The hinge portion may be aligned substantially in parallel to the tear line disposed in the longitudinal direction of the passenger air-bag door.

The groove of the hinge portion may include at least a corrugation formed in a traverse direction of the passenger air-bag door, and the lower resin layer includes a bending portion having a shape corresponding to the corrugation of the hinge portion.

In another aspect of the present invention, the crash pad for an automotive interior may further include an upper resin layer disposed on an upper surface of the main resin layer to cover the hinge portion and/or the tear line, and having a flexibility or a percentage of elongation superior to the main resin layer.

The upper and lower resin layers may be made of the same resin having a flexibility or a percentage of elongation superior to the main resin layer.

The upper and lower resin layers may be made of thermoplastic olefin (TPO).

The main resin layer may be made of polypropylene filled (PPF) resin.

The main resin layer may include a slit having a width between approximately 1 mm and approximately 2 mm on a boundary between the door region and the crash pad region so as to prevent the upper resin layer from propagating to the crash pad region from the door region during formation of the upper resin layer.

In further another aspect of the present invention, an apparatus for manufacturing a crash pad for an automotive interior, including a passenger air-bag door, may include an upper mold including an upper recess, a lower mold including a lower recess and matched with the upper mold to define a space enclosed by the upper and lower recesses, an upper core disposed in the upper recess of the upper mold to be slidable up and down therein, a lower core disposed in the lower recess of the lower mold to be slidable up and down therein, and including a convex portion for formation of a hinge portion of a passenger air-bag door, in which the convex portion includes thereon at least a corrugation arranged in a width direction of the lower core, first and second supply lines connected to the upper recess at different positions, and a third supply line connected to the lower recess.

A first resin may be injected through the first supply line, and, after completion of the supply of the first resin, a second resin having a flexibility or a percentage of elongation superior to the first resin may be injected through the second and third supply lines simultaneously.

The lower mold may include on an upper surface thereof a wedge protruding towards the upper core by a predetermined length for forming a tear line of the passenger air-bag door.

The upper recess may include a first cavity and a second cavity having a depth deeper than the first cavity, and the upper core is disposed in the second cavity and has a protruding dam formed along an edge of a lower surface thereof.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 3A to 3C are cross-sectional views showing a configuration for preventing a door hinge portion of the crash pad shown in FIG. 2 from being broken at the time of deployment of an air-bag, in which FIG. 3A represents a state before the deployment of the air-bag, FIG. 3B represents an initial state of the deployment of the air-bag, and FIG. 3C represents a state of the complete deployment of the air-bag.

FIGS. 6 to 8 are cross-sectional views showing a process of manufacturing the crash pad using the apparatus shown in FIG. 5, in which FIG. 6 represents formation of a main resin (PPF) layer, FIGS. 7 and 8 represent formations of upper and lower resin (TPO) layers.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
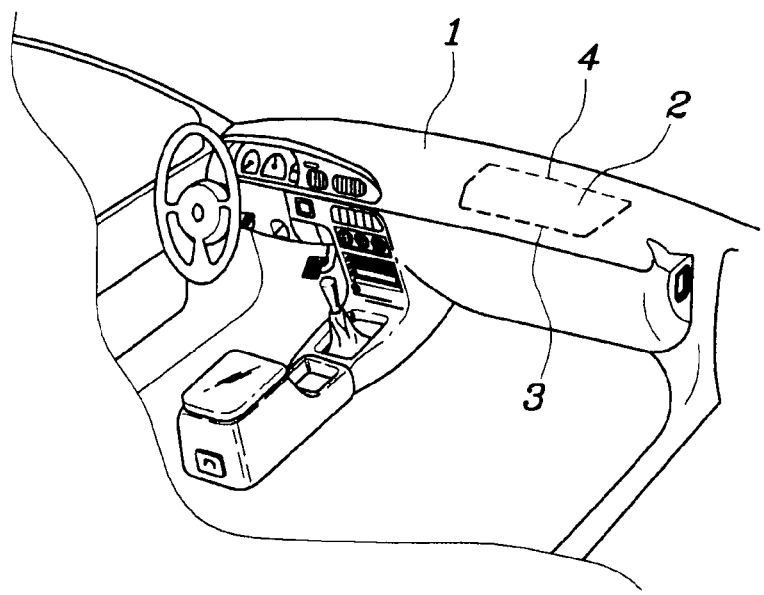
FIG. 1 is a schematic perspective view showing a conventional crash pad including a passenger air-bag door.
Figure 2:
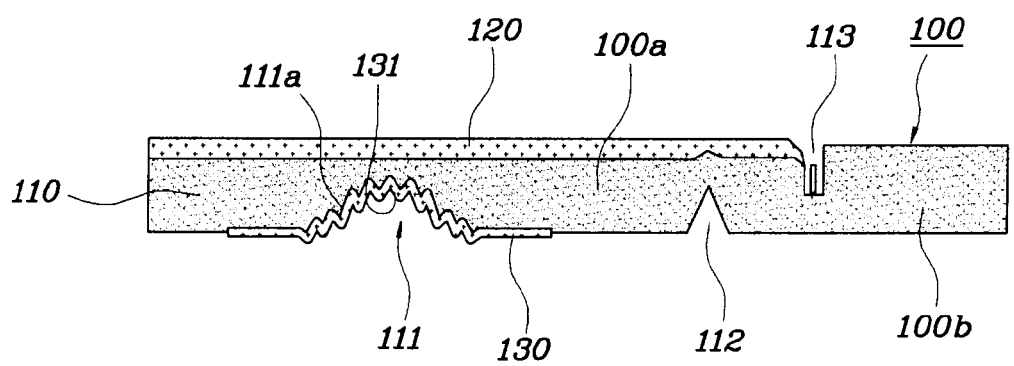
FIG. 2 is a cross-sectional view of an exemplary crash pad according to the present invention.
Figure 3A:
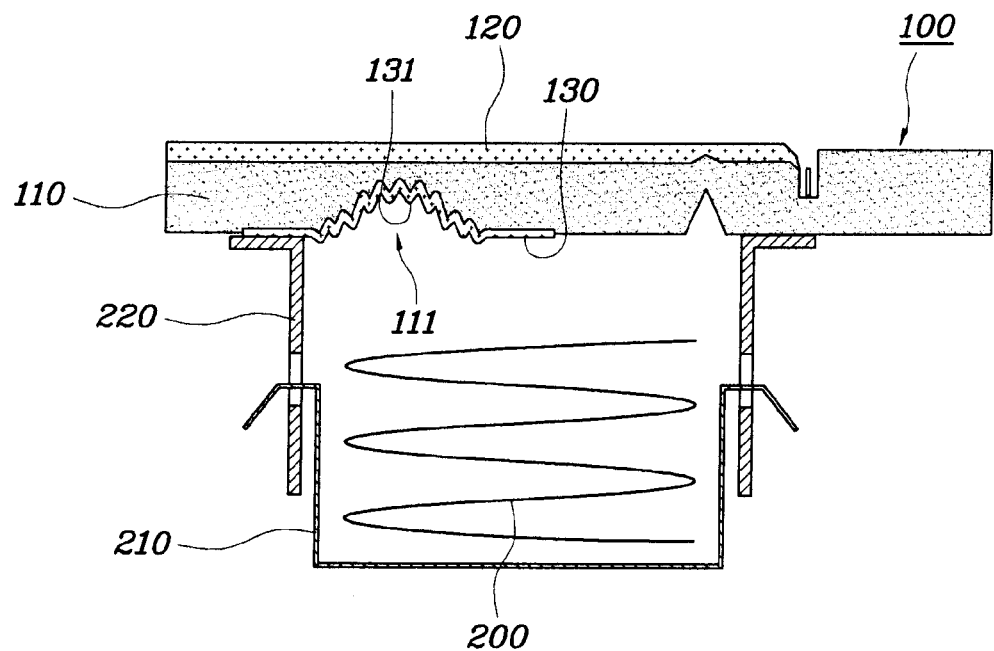
Figure 3B:
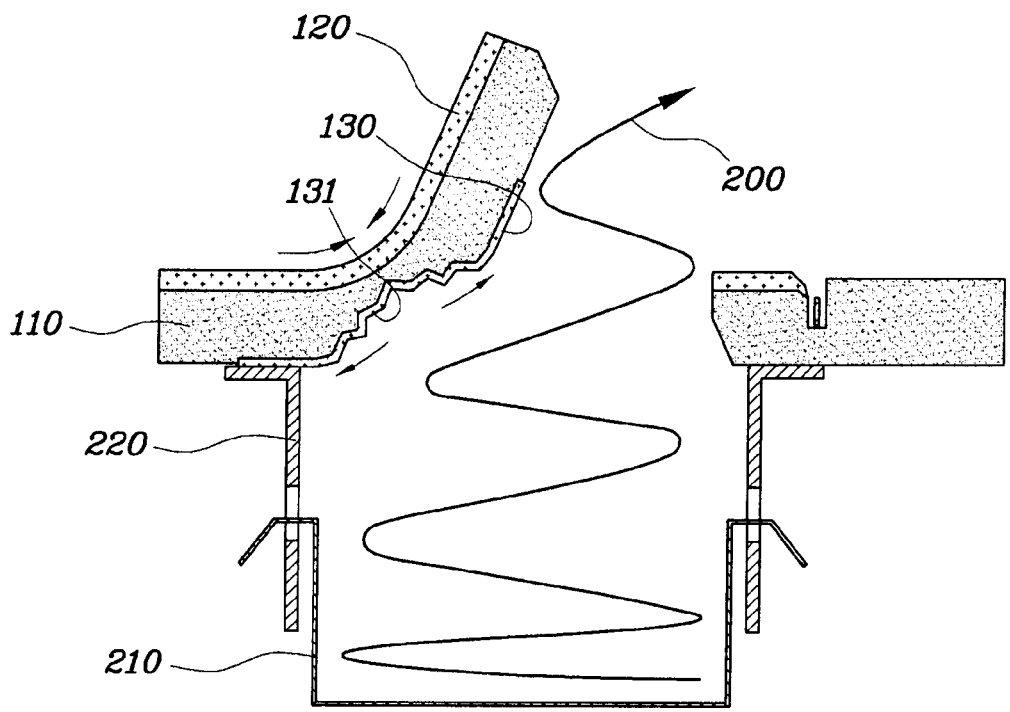
Figure 3C:
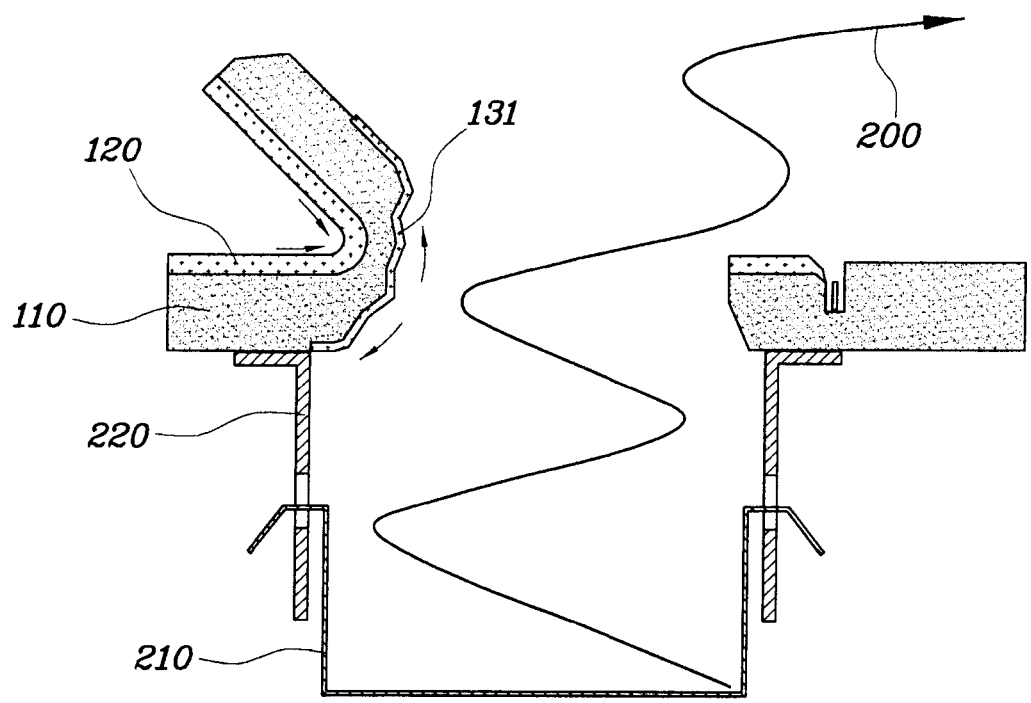

Referring first to FIGS. 2 to 3C, a crash pad according to an exemplary embodiment of the present invention is described.

As shown in FIG. 2, the crash pad 100 according to various embodiments of the present invention comprises a main resin layer 110 made of polypropylene filled (PPF) resin, and upper and lower resin layers 120, 130 made of thermoplastic olefin (TPO) resin that is more flexible than the PPF resin. The PPF resin is a combination of polypropylene resin and filler added thereto, for example talc-filled polypropylene resin.

The crash pad 100 is integrally molded through a so-called over-molding process, in which the upper resin layer 120 may be an optional element.

The main resin layer 110 may be divided into a door region 100a which is defined by a hinge portion 111 and a tear line 112, and a crash pad region 100b positioned around the door region 100a. In various embodiments, although the door region 100a and the crash pad region 100b are made of the same resin (PPF), both the regions may also be made of different resins.

In various embodiments of the present invention, the hinge portion 111 is configured such that a recess is longitudinally formed along the lower surface of the main resin layer 110.

Specifically, a transverse section of the hinge portion 111 has a gently curved arched shape with a predetermined curvature so that stress is not concentrated to bottom portion of the hinge portion 111. The hinge portion 111 is provided on a lower surface with corrugations 111a formed along the width of the hinge portion, in which the respective corrugations 111a extend in a longitudinal direction of the hinge portion. The tear line 112 is formed on a lower surface of the main resin layer 110 to exhibit a neat appearance. Of course, the invisible tear line may be formed on another area on the main resin layer 110, and may be formed even after molding of the crash pad 100.

In other embodiments of the present invention, the hinge portion 111 has a predetermined thickness without corrugations. The thickness of lower resin layer 130 is configured sufficient enough to extend with elasticity as the main resin layer 110 is bent In various embodiments of the present invention, the upper resin layer 120 is provided on an upper surface of the main resin layer 110 to cover the door region 100a. The upper resin layer 120 not only improves appearance and tactile sense of the crash pad 100 but also increases a rupture strength of the hinge portion 111 in conjunction with the lower resin layer 130. Meanwhile, a slit 113 having a width of 1-1.5 mm is formed along a boundary area between the door region 100a and the crash pad region 100b of the main resin layer 110 in order to prevent the upper resin 120 from propagating to the crash pad region 100b from the door region 100a during a molding operation of the upper resin layer 120 (an injection molding of TPO resin) and to ensure a neat boundary line between the door region 100a and the crash pad region 100b.

The lower resin layer 130 is provided on a lower surface of the main resin layer 110 to cover the hinge portion 111. The lower resin layer 130 includes a bending portion 131 having a corrugated shape corresponding to the corrugations 111a of the hinge portion 111. The bending portion 131 includes corrugations formed in a thickness direction such that the upper corrugated surface of the bending portion 131 is in close contact with the corrugations 111a of the hinge portion 111 and the lower corrugated surface of the bending portion 131 is configured to correspond to the upper corrugated surface. As a result, the bending portion 131 exhibits excellent flexibility.

Referring to FIGS. 3A to 3C, an effect of reinforcing rigidity of the hinge portion 111 of the crash pad 100 is described.

As shown in FIG. 3A, in the case of crash pad 100 mounted on an automobile, a chute 220 of an air-bag module is fused to a back side of the door region 100a, i.e., a back side of a passenger air-bag door. The chute 220 is assembled with a housing 210 which accommodates a folded air-bag 200 therein.

As shown in FIGS. 3B and 3C, upon deployment of the passenger air-bag, the air-bag 200 breaks the tear line 112 with the aid of a gas pressure from an inflator. At the same time, the air-bag 200 pushes out the passenger air-bag door and expands towards the passenger. At this point, the bending portion 131 covering the hinge portion 111 is stretched thus increasing tension strength of the hinge portion 111 whereas the upper resin layer 120 is compressed with restoring force and thus a bending angle or a radius of curvature on a back side of the hinge portion 111 is increased thus mitigating the stress concentrated on the hinge portion 111. In this regard, since the surface of the hinge portion 111 and the bending portion 131 of the lower resin layer 130 are provided with corrugations, respectively, distensibility of the area is excellent. Furthermore, since a contact area between the hinge portion 111 and the lower resin layer 130 is increased due to the corrugations, separation of the hinge portion 111 from the main resin layer 110 is prevented even if the hinge portion 111 is broken at the time of deployment of the air-bag is efficiently avoided.

In embodiments that the hinge portion 111 has a predetermined thickness without corrugations, the lower resin layer 130 may extend with elasticity as the main resin layer 110 is bent so that separation of the hinge portion 111 from the main resin layer 110 is prevented.

Figure 4:
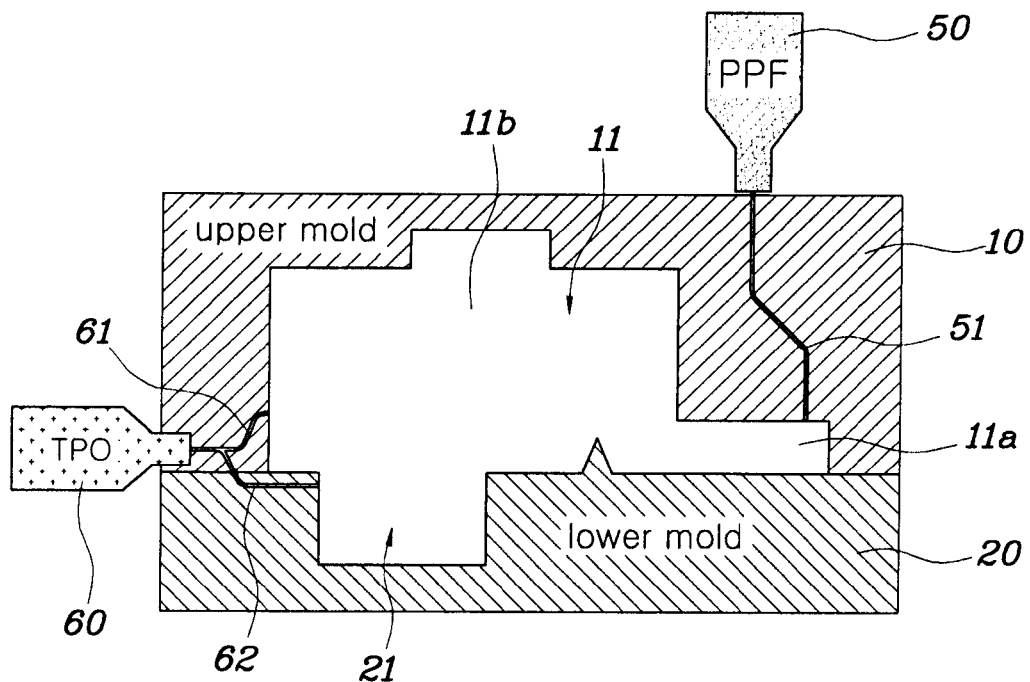
FIG. 4 is a cross-sectional view of an exemplary apparatus for the crash pad according to the present invention, in which upper and lower cores are omitted for the sake of explanation.
Figure 5:
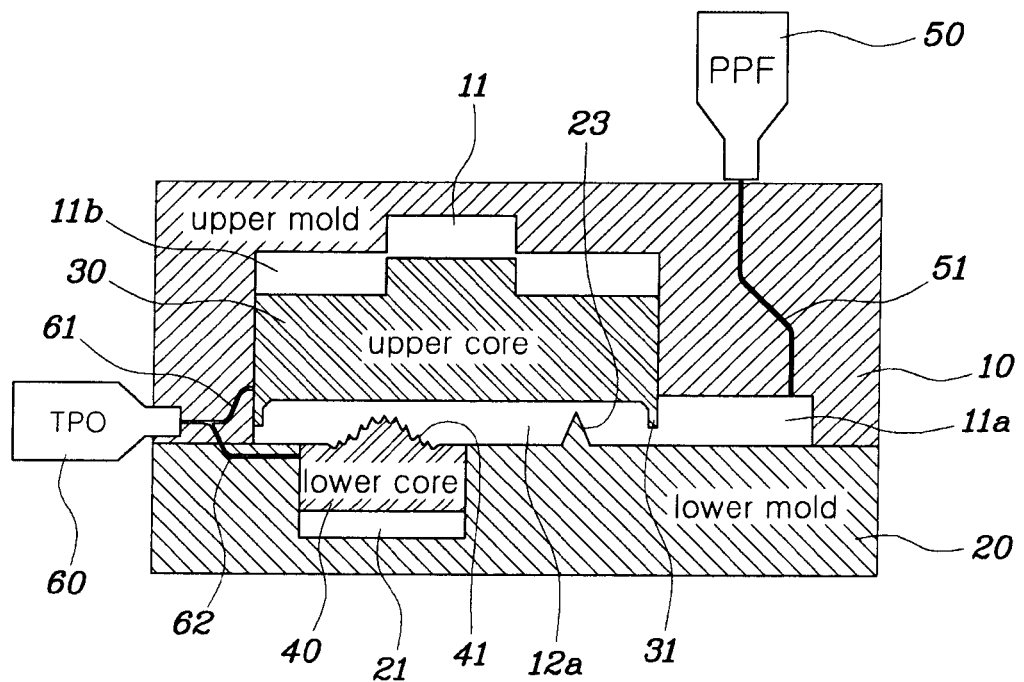
FIG. 5 is a cross-sectional view of the apparatus for the crash pad shown in FIG. 4, in which the upper and lower cores are disposed in upper and lower mold, respectively.

Referring to FIGS. 4 and 5, an apparatus for manufacturing the above-described crash pad is now described.

The apparatus comprises a mold and a resin supply unit. The mold comprises upper and lower mold 10, 20, and upper and lower cores 30, 40 which are disposed in the upper and lower mold 10, 20, respectively. The resin supply unit comprises first and second resin supply portions 50, 60, and first to third supply lines 51, 61, 62.

The upper mold part 10 includes an upper recess 11 at a lower side, in which the upper recess 11 comprises a first cavity 11a and a second cavity 11b having a depth deeper than the first cavity 11a. The lower mold part 20 includes a lower recess 21 at an upper side. The upper and lower mold 10, 20 are matched with each other so that an enclosed space is defined by the upper and lower recesses 11, 12. Furthermore, the lower mold part 20 includes a wedge 23 protruding from the upper surface thereof to provide a back side of the passenger air-bag door with the tear line 112 (see FIG. 2).

The upper core 30 is disposed in the second cavity 11b of the upper mold part 10 to be slidable up and down. The upper core 30 includes a dam 31, which protrudes and is positioned along an edge of the lower surface of the upper core 30 facing the lower mold part 20. The lower core 40 is disposed in the lower recess 21 of the lower mold 20 to be slidable up and down. The lower core 40 is provided at an upper surface facing the upper mold part 10 with a convex portion 41 having a predetermined length so as to form the hinge portion 111 (see FIG. 2) of the passenger air-bag door. The convex portion 41 includes corrugations which are arranged in a width direction.

The first resin supply portion 50 communicates with the first supply line 51 connected to the first cavity 11a of the upper recess 11. The second resin supply portion 60 communicates with the second supply line 61 and the third supply line 62, which are connected to the second cavity 11b and the lower recess 21, respectively. For exemplary purposes, the first resin supply portion 50 is intended to supply PPF resin, and the second resin supply portion 60 is intended to supply TPO resin.

Referring to the drawings, in particular, to FIGS. 5 to 9, a process of manufacturing the crash pad using the apparatus is now described.

Figure 6:
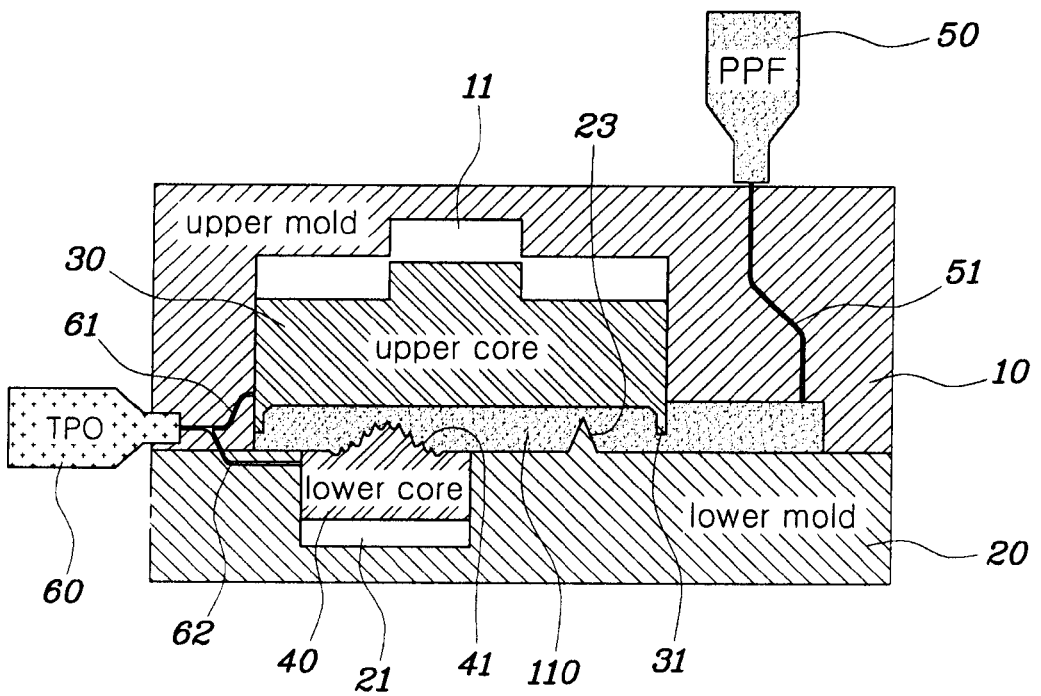
Figure 7:
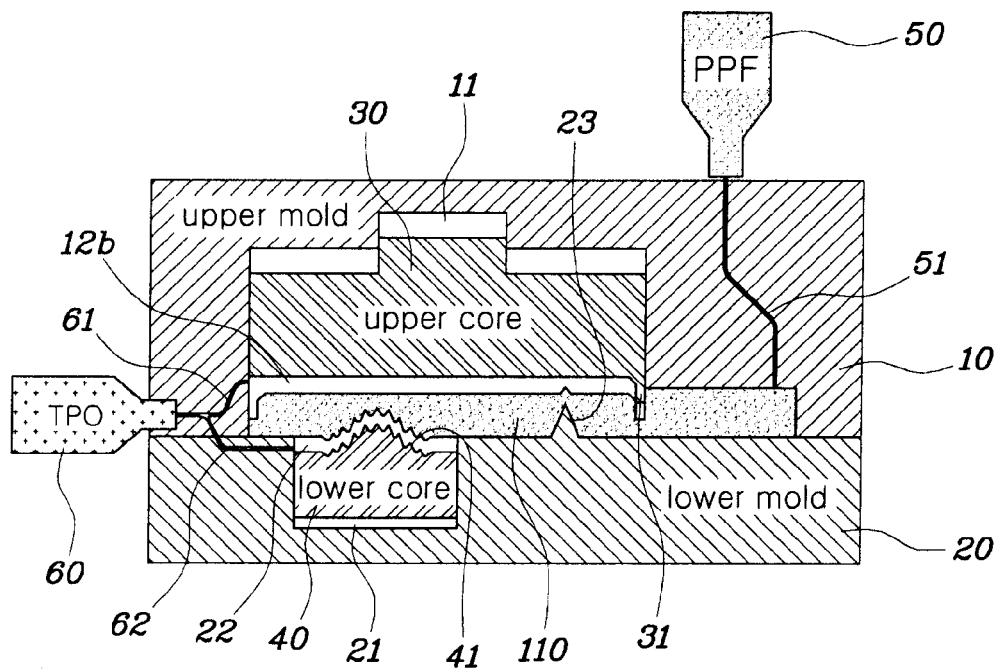
Figure 8:
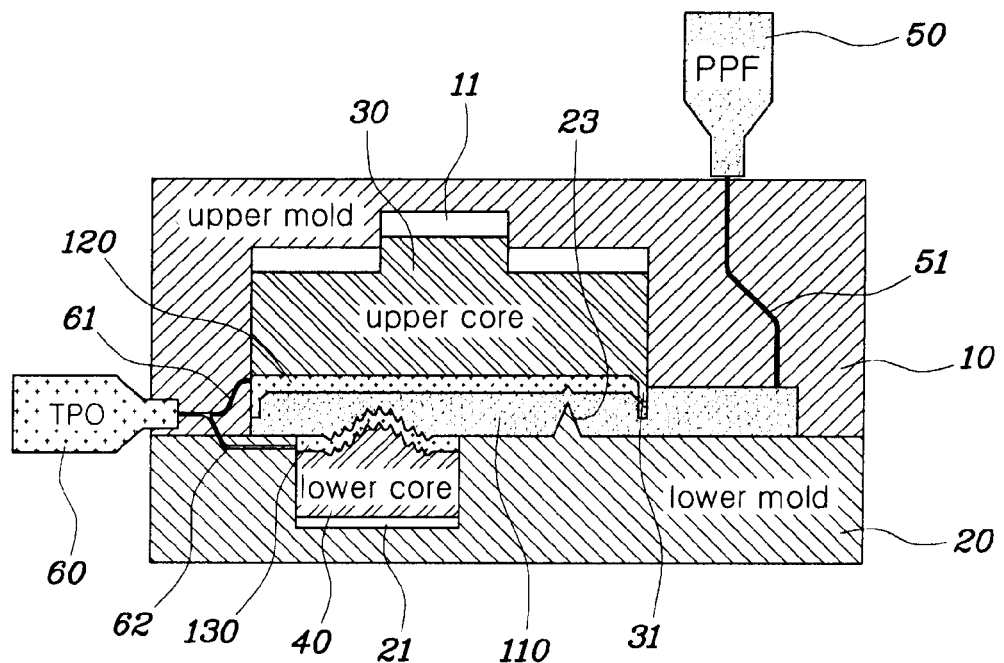

While the upper core 30 and the lower core 40 are disposed at respective advanced positions thus defining a main resin layer-molding space 12a (see FIG. 5), supply of PPF resin from the first resin supply portion 50 through the first supply line 51 results in the main resin layer 110 (see FIG. 6). At this point, the convex portion 41 of the lower core 40 forms the hinge portion 111 on the lower surface of the main resin layer 110, and the wedge 23 of the lower mold part 20 forms the tear line 112 on the lower surface of the main resin layer 110. During the formation of the main resin layer 110, the dam 31 of the upper core 30 protrudes into the main resin layer-molding space 12a. Due to the presence of the dam 31, the slit 113 is formed in the upper surface of the main resin layer 110, in particular, in the area between the door region 100a and the crash pad region 100b.

Prior to solidification of the PPF resin supplied into the main resin layer-molding space 12a, the upper and lower cores 30, 40 are retracted to additionally define an upper resin layer-molding space 12b and a lower resin layer-molding space 22 (see FIG. 7), and the upper resin layer-molding space 12b and the lower resin layer-molding space 22 are simultaneously supplied with TPO resin from the second resin supply portion 60 through the second and third supply lines 61, 62 (see FIG. 8), resulting in the creation of the upper resin layer 120 and the lower resin layer 130. In various embodiments, although the simultaneous supply of the same kind of resin can contribute to improvement in efficiency of the process of manufacturing the crash pad, it is also to be understood that supplying different kinds of resins through the second and third supply lines 61, 62 falls within the scope of the present invention.

Figure 9:
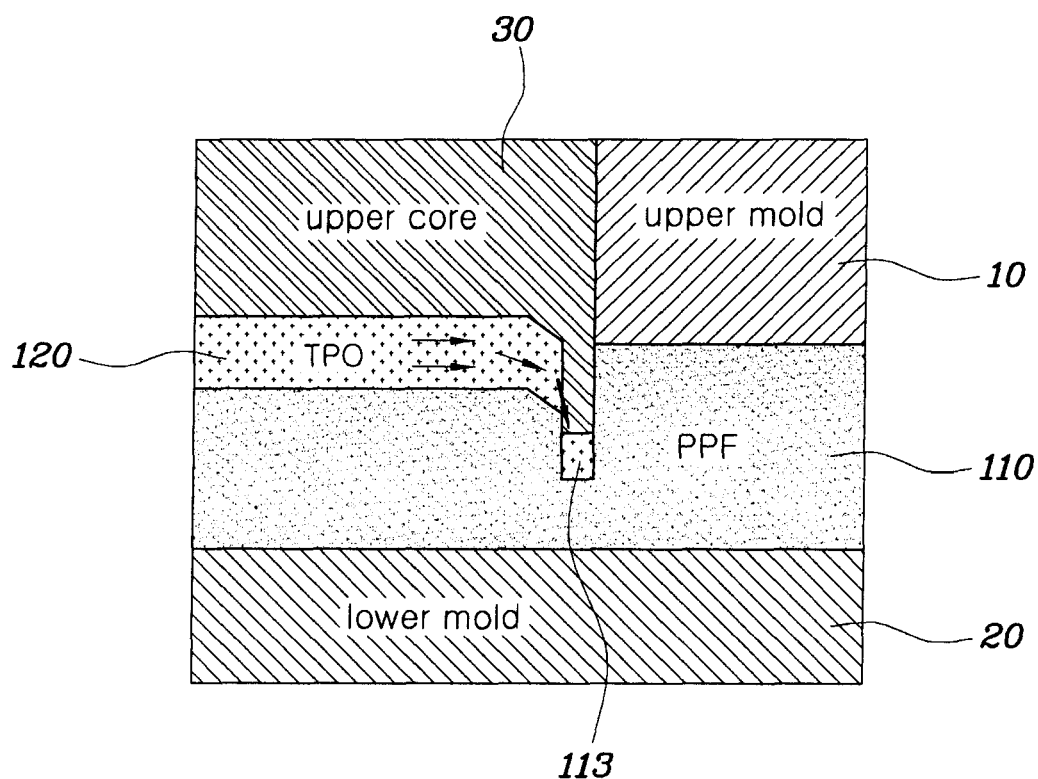
FIG. 9 is a cross-sectional view showing functions of a dam formed on the upper core in the formation of the upper resin layer shown in FIG. 8.

During the formation of the upper and lower resin layers 120, 130, the upper core 30 is positioned such that the dam 31 is partially disposed in the slit 113 of the main resin layer 110. As shown in FIG. 9, when TPO resin is injected into the upper resin layer-molding space 12b while the slit 113 is blocked by the dam 31, the propagation of the TPO resin to the first cavity 11a, i.e., to the crash pad region is avoided. Even if there is partial leak of the TPO resin, the leaking resin is held only in the slit 113, and cannot infiltrate into a clearance between the upper mold part 10 and the main resin layer 110. In various embodiments, the slit 113 has a width of about 1-2 mm, and preferably a width of about 1-1.5 mm. At this point, the TPO resin caught in the slit 113 is invisible from the outside. Consequently, the resulting product exhibits a neat appearance on the boundary between the door region 100a and the crash pad region 100b.

As described above, according to the present invention, a main resin layer of a crash pad is provided at upper and lower surfaces with resin layers which are more flexible than the main resin layer, and a hinge portion is provided with corrugations. Consequently, even if the hinge portion is abruptly folded by the expansionary force of a passenger air-bag, it is possible to prevent breaking the hinge portion and separation of an air-bag door at the time of deployment of the air-bag.

For convenience in explanation and accurate definition in the appended claims, the terms "up" or "upper", "down", and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A crash pad for an automotive interior including a passenger air-bag door, the crash pad comprising:
    a main resin layer including a door region having a hinge portion and a tear line for a deployment of an air-bag and a crash pad region at least partially surrounding the door region, in which the hinge portion has a groove formed on a lower surface of the main resin layer along a longitudinal direction of the passenger air-bag door; and a lower resin layer disposed on a lower surface of the main resin layer to cover the hinge portion and having flexibility or a percentage of elongation superior to the main resin layer;

wherein the main resin layer includes a slit having a width between approximately 1 mm and approximately 2 mm on a boundary between the door region and the crash pad region so as to prevent the upper resin layer from propagating to the crash pad region from the door region during formation of the upper resin layer.

2. The crash pad for an automotive interior according to claim 1, wherein an airbag housing is disposed under the main resin layer and encloses the hinge portion and the tear line.

3. The crash pad for an automotive interior according to claim 1, wherein a transverse section of the groove has an upwardly-concave shape with a predetermined curvature.

4. The crash pad for an automotive interior according to claim 1, wherein the hinge portion is aligned substantially in parallel to the tear line disposed in the longitudinal direction of the passenger air-bag door.

5. The crash pad for an automotive interior according to claim 1, wherein the groove of the hinge portion includes at least a corrugation formed in a traverse direction of the passenger air-bag door, and the lower resin layer includes a bending portion having a shape corresponding to the corrugation of the hinge portion.

6. The crash pad for an automotive interior according to claim 1, further comprising an upper resin layer disposed on an upper surface of the main resin layer to cover the hinge portion and/or the tear line, and having a flexibility or a percentage of elongation superior to the main resin layer.

7. The crash pad for an automotive interior according to claim 6, wherein the upper and lower resin layers are made of the same resin having a flexibility or a percentage of elongation superior to the main resin layer.

8. The crash pad for an automotive interior according to claim 7, wherein the upper and lower resin layers are made of thermoplastic olefin (TPO).

9. The crash pad for an automotive interior according to claim 1, wherein the main resin layer is made of polypropylene filled (PPF) resin.

10. A passenger vehicle comprising the crash pad for an automotive interior according to claim 1.

11. An apparatus for manufacturing a crash pad for an automotive interior including a passenger air-bag door, the apparatus comprising:

an upper mold including an upper recess;

a lower mold including a lower recess and matched with the upper mold to define a space enclosed by the upper and lower recesses;

an upper core disposed in the upper recess of the upper mold to be slidable up and down therein;

a lower core disposed in the lower recess of the lower mold to be slidable up and down therein, and including a convex portion for formation of a hinge portion of a passenger air-bag door, in which the convex portion includes thereon at least a corrugation arranged in a width direction of the lower core;

first and second supply lines connected to the upper recess at different positions; and a third supply line connected to the lower recess.

12. The apparatus according to claim 11, wherein a first resin is injected through the first supply line, and, after completion of the supply of the first resin, a second resin having a flexibility or a percentage of elongation superior to the first resin is injected through the second and third supply lines simultaneously.

13. The apparatus according to claim 11, wherein the lower mold includes on an upper surface thereof a wedge protruding towards the upper core by a predetermined length for forming a tear line of the passenger air-bag door.

14. The apparatus according to claim 11, wherein the upper recess includes a first cavity and a second cavity having a depth deeper than the first cavity, and the upper core is disposed in the second cavity and has a protruding dam formed along an edge of a lower surface thereof.

* * * * *